D. L. MATTERN.
WINDING DEVICE.
APPLICATION FILED MAR. 2, 1921.

1,417,402. Patented May 23, 1922.

INVENTOR
David L. Mattern
BY
Ray B Whitman
ATTORNEY

UNITED STATES PATENT OFFICE.

DAVID L. MATTERN, OF NEW YORK, N. Y., ASSIGNOR TO COLUMBIA GRAPHOPHONE MANUFACTURING COMPANY, OF BRIDGEPORT, CONNECTICUT, A CORPORATION OF DELAWARE.

WINDING DEVICE.

1,417,402.  Specification of Letters Patent.  Patented May 23, 1922.

Application filed March 2, 1921. Serial No. 449,035.

*To all whom it may concern:*

Be it known that I, DAVID L. MATTERN, a citizen of the United States, and a resident of New York city, Kings County, and State of New York, have invented certain new and useful Improvements in a Winding Device, of which the following, taken in connection with the accompanying drawings, is a specification.

This invention relates to a winding device for spring motors and has for an object to provide a flexible transmission or coupling between the member to be wound— as for instance the spring shaft—and the winding member—as the crank-handle—so that, if imperfect alignment exists between their respective bearings, this condition will neither prevent nor hinder the winding, as would be the case if the connection were rigid.

While the invention is described particularly with reference to spring motors for phonograph use, it should be here pointed out that it is susceptible of other uses in which substantially similar conditions or problems exist.

In the manufacture of phonographs, it has been found for various reasons that the motor, when assembled in the cabinet, does not always align with the crank-handle bearing, provided in the side of the cabinet; and, in many cases, where the parts of the phonograph are in proper alignment originally, a disarrangement may develop which would ordinarily prevent proper winding. This invention avoids these objectionable features.

Another object of the invention is to provide a device of simple and economical construction which will not add materially to the cost of the motor, and as herein disclosed, may be readily secured as a unit attachment upon the end of the usual spring-winding shaft.

A further object is to facilitate the engagement of the crank-handle with the shaft, and in this respect the invention constitutes a direct improvement over the device shown in the United States patent to J. J. Scully, No. 1,351,405 of August 1920, in which is disclosed a funnel-shaped guide member connected to the end of the winding arbor and adapted to guide the winding-crank into engagement therewith. According to this invention, as embodied in the present disclosure, the winding arbor has rigidly secured thereto a tubular extension member having a flared end adapted to guide the engagement of the crank-handle; and within the tubular member there is provided a coupling member having loose or universal-joint-connection therewith and adapted to be engaged by the crank-handle. This construction permits the crank-handle to be attached to the motor with great facility, even when the parts are entirely concealed within a cabinet, and furthermore, has the advantage of entirely enclosing and protecting the movable coupling member.

With the above and other objects in view, an embodiment of the invention is shown in the accompanying drawings, and this embodiment will be hereinafter more fully described with reference thereto, and the invention will be finally pointed out in the claims.

In the drawings—

Similar reference characters indicate corresponding parts throughout the several figures of the drawings.

Figure 1:
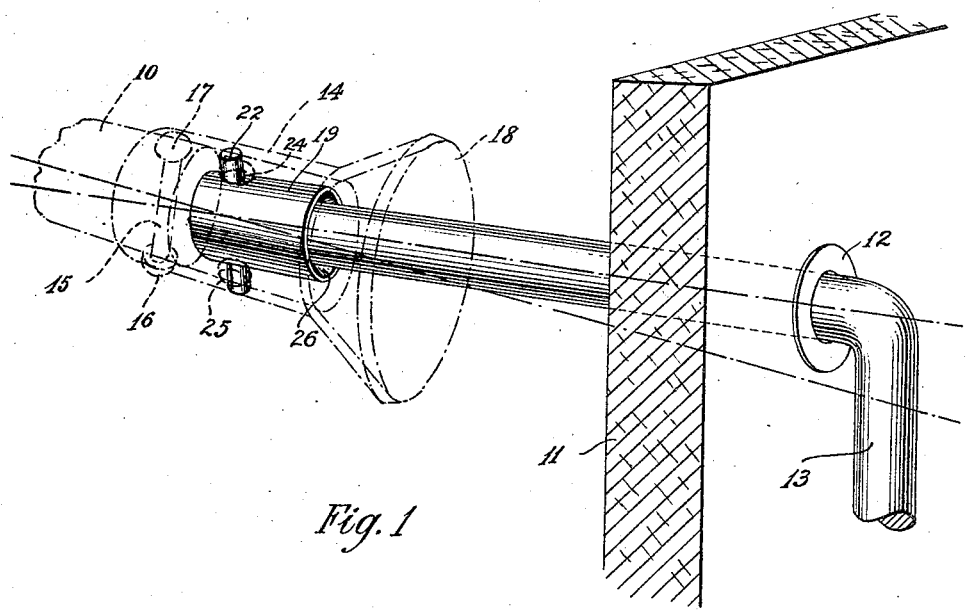
Figure 1 is a perspective phantom view illustrating the device connected to the crank-handle and disclosing a part of the cabinet in section.
Figure 2:
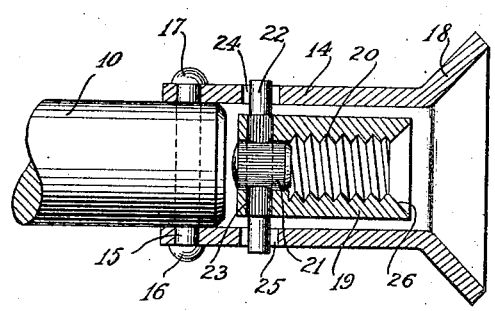
Figure 2 is a view showing the device partly in vertical section attached to the end of the motor shaft.
Figure 3:
Figures 3 and 4 are detail views in elevation of two of the parts employed, i. e. the coupling member plug, and the coupling member pivot pin.

Referring to the drawings,—the winding-shaft or arbor 10 of the motor is journaled in suitable bearings of a motor-frame (not shown), and is disposed in approximate alignment with an aperture in the side 11 of the cabinet and in which a flanged bushing 12 is fitted to form a bearing for the crank-handle 13, the bearing being of such size as to permit a limited swiveling movement of the crank-handle. Ordinarily the crank-handle would be connected directly with the end of the shaft 10.

According to the present invention, the shaft 10 has a tubular extension-sleeve 14 rigidly secured thereto by means of a transversely disposed rivet-pin 15, having a head 16 provided at one end, and a similar head 17 upset at its other end after insertion. The sleeve is cylindrical for the greater part of its length, has its inner end telescopically mounted upon the shaft, and at its outer or forward end is provided with a funnel-shaped flare 18 adapted—as will presently appear—to guide the crank-handle into positive connection with the device.

Housed within the cylindrical portion of the sleeve 14 there is provided a coupling-member 19, tubular in form, and of smaller exterior diameter than the bore of the sleeve, being interiorly screw-threaded at 20 for a portion of its length and closed at its inner end by means of a plug 21. A transverse pin 22, having projecting ends, is secured in the rear portion of the coupling-member by insertion through a hole 23 extending transversely therethrough and through the plug. The ends of the pin loosely engage holes 24 and 25 provided in the sleeve 14 and which are in forwardly spaced relation to the end of the shaft 10, the engagement being such as to translate the turning movement of the winding-crank—and its rigidly connected coupling-member—to the rigidly connected sleeve and shaft, and at the same time to permit free swinging movement of the coupling-member in all directions.

Figure 4:

The plug 21, which is preferably of softer metal than the tube forming the body of the coupling-member 19, is knurled before its insertion in the tube, the external diameter of the knurling being over-size relatively to the bore of the tube, so that as the plug is driven into the hole it becomes wedged in place. The hole 23 is then drilled, and the coupling-member inserted in the member 14 so that the hole 23 aligns with the holes 24 and 25. The pin 22 which is also provided with over-size knurling,— except at its ends, as shown in Figure 4,— is then driven in through one of the holes 24 and 25, the knurling causing it to wedge into place. The manner of forming and assembling these parts provides a substantially one-piece structure, the production of which is conveniently suited to economical manufacturing methods.

The coupling-member is provided at its forward end with a beveled counter-sink 26, disposed in substantial continuity with the inner converging surface of the flared portion 18. The screw-threaded end of the crank-handle is adapted to be screwed into engagement with the coupling-member, and it will be understood that this engagement is greatly facilitated by the funnel-shaped guide provided by the flared portion 18. These parts are concealed within the cabinet so that without such guiding means their proper engagement would be exceedingly difficult.

Figure 1 clearly illustrates the operation in the case of a machine in which the unalignment between the motor shaft 10 and the bearing 12 is very pronounced. By means of this invention, however, the crank-handle may be wound quite as freely as if the parts were in alignment, the universal joint connection of the crank-handle with the member 14 permittig the turning movement of the crank to be freely translated to the shaft 10.

It is to be understood that without departing from the invention, various other forms of universal-joint-connection between the coupling-member and the extension member may be employed. Also the coupling-member may be formed from a solid piece of material as distinguished from a tube, and having the screw-threaded socket only partially bored therethrough, thereby forming an integral closure for the inner end of the socket in place of the non-integral plug 21. While, therefore, there is illustrated and described a preferred and satisfactory embodiment, it will be obvious that the above and other changes may be made therein within the sprit and scope of the invention as defined in the appended claims.

Havig now described the invention, what is claimed as new and for which Letters Patent of the United States is desired, is:

1. The combination with a crank-wound motor and a crank-bearing spaced therefrom, of a winding attachment, comprising a tubular member adapted at one end to be rigidly attached to the shaft of the motor and provided at its other end with a flared guide portion, a coupling-member loosely disposed within the tubular member inwardly of the flared portion and spaced from said crank-bearing, and having a screw-threaded bore and a counter-sink in substantial continuity with the flared guide portion, and means forming universal-joint-connection between the coupling-member and the tubular member, the flared guide portion being adapted to guide the crank into engagement with the coupling-member.

2. The combination with a crank-wound motor and a crank-bearing spaced therefrom, of a winding attachment, comprising a tubular member adapted at one end to be rigidly attached to the shaft of the motor and provided at its other end with a flared portion, a coupling-member loosely disposed within the tubular member in spaced relation to said crank-bearing and inwardly of the flared portion and adapted to be connected to the crank, and means forming universal-joint-connection between the coupling-member and the first member, the flared guide portion being adapted to guide the crank into engagement with the coupling-member.

3. The combination with a crank-wound motor and a crank-bearing spaced therefrom, of a winding attachment, comprising a tubular guide member adapted to be rigidly attached to the shaft of the motor, a coupling-member loosely disposed entirely within the tubular member in spaced relation to said crank-bearing and having a screw-threaded bore adapted to be engaged by the threaded end of the crank, and means forming universal-joint-connection between the coupling-member and the tubular member.

4. The combination with a crank-wound motor and a crank-bearing spaced therefrom, of a winding attachment, comprising a tubular guide member adapted to be rigidly attached to the shaft of the motor, and a coupling-member spaced from the crank-bearing and loosely disposed entirely within the tubular member having universal-joint-connection therewith and adapted to be connected to a crank.

5. The combination with a crank-wound motor and a crank-bearing spaced therefrom, of a winding attachment, comprising a member adapted to be rigidly attached to the shaft of the motor, a coupling-member spaced from the crank-bearing and having universal-joint-connection with the first member and adapted to be connected to a crank, and means for guiding the engagement of the parts.

6. In a winding mechanism for cabineted motors, a shaft spaced from the cabinet, a crank having bearing in the cabinet, coupling means within the cabinet forming a universal-joint-connection between the shaft and the crank, and means for guiding the engagement of the parts.

7. In a winding mechanism for cabineted motors, a shaft spaced from the cabinet, a crank having bearing in the cabinet, pivotal coupling means within the cabinet forming connection between the shaft and the crank, and means for guiding the engagement of the parts.

8. In winding mechanism for cabineted motors, a shaft spaced from the cabinet, an extension section, a crank having bearing in the cabinet, coupling means for the crank within the cabinet and having loose diametrically opposite trunnion connections with the extension section, and means for guiding the engagement of the parts.

9. In winding mechanism for cabineted motors, a shaft spaced from the cabinet, a tubular extension section telescopically secured upon the end of the shaft, a crank, having bearing in the cabinet, coupling means for the crank within the cabinet and having universal-joint-connection with the extension section, and means for guiding the engagement of the parts.

10. In winding mechanism for cabineted motors, a shaft spaced from the cabinet, a tubular extension section within the cabinet, a crank having bearing in the cabinet, coupling means for the crank disposed entirely within the tubular extension section and having universal-joint-connection, and means for guiding the engagement of the parts.

11. In winding mechanism for cabineted motors, a shaft spaced from the cabinet, a tubular extension section within the cabinet, a crank having bearing in the cabinet, coupling means for the crank disposed within the tubular extension section and having universal-joint-connection, and means for guiding the engagement of the parts.

12. In winding mechanism for motors, a shaft, an extension section, a crank, a bearing for the crank coupling means for the crank spaced from said bearing and having universal-joint-connection with the extension section, and means for guiding the engagement of the parts.

13. In a winding mechanism, a winding member having a fixed bearing, a tubular guide member and a flexible coupling for the winding member and tubular member spaced from said fixed bearing and located within the tubular member.

14. In a winding mechanism, a winding member having a fixed bearing, a tubular member and a flexible coupling for the winding member and tubular member spaced from said fixed bearing and located within the tubular member, and means for guiding the engagement of the parts.

15. In a winding mechanism for motors, a shaft, a tubular member secured to the shaft and having a flared funnel-shaped end, flexible coupling means disposed inwardly of the flared end, spaced from said coupling means, and a detachable crank secured to the coupling means and adapted to be guided into engagement therewith by the flared end.

16. In a winding mechanism for motors, a shaft to be wound, winding means having its bearing spaced from the motor and mounted in a structure non-integral and detachable from the motor, means flexibly connecting the shaft and the winding means, and means for guiding the engagement of the parts.

17. In a winding mechanism for motors, a shaft to be wound, means for winding the shaft, a universal joint connection therebetween, and means for guiding the engagement of the parts.

18. In a winding mechanism for motors, a shaft to be wound, means for winding the shaft, a flexible connection therebetween, and means for guiding the engagement of the parts.

19. In a winding mechanism for motors, a shaft to be wound, flexible connection means provided upon the shaft, and detachable winding means adapted to be connected to said flexible connection means, and means whereby said last named means may be directed into engagement with the connection means.

20. In a winding mechanism for motors, a shaft to be wound, detachable means for winding the shaft, a flexible connection therebetween, and flared means for directing the engagement of the parts.

Signed at Bridgeport, in the county of Fairfield, and State of Connecticut, this 28th day of February, A. D. 1921.

DAVID L. MATTERN.

Certificate of Correction.

It is hereby certified that in Letters Patent No. 1,417,402, granted May 23, 1922, upon the application of David L. Mattern, of New York, N. Y., for an improvement in "Winding Devices," errors appear in the printed specification requiring correction as follows: Page 2, line 77, for the misspelled word "permittig" read *permitting;* same page, line 98, for the word "Havig" read *Having;* page 3, line 108, claim 15, after the word "end" insert the words *a crank bearing;* and that the said Letters Patent should be read with these corrections therein that the same may conform to the record of the case in the Patent Office.

Signed and sealed this 27th day of June, A. D., 1922.

[SEAL]

KARL FENNING,
*Acting Commissioner of Patents.*